April 3, 1934.    W. T. HARDING    1,953,403
UNIVERSALLY ADJUSTABLE BEARING BOX
Filed Sept. 10, 1928    3 Sheets-Sheet 1
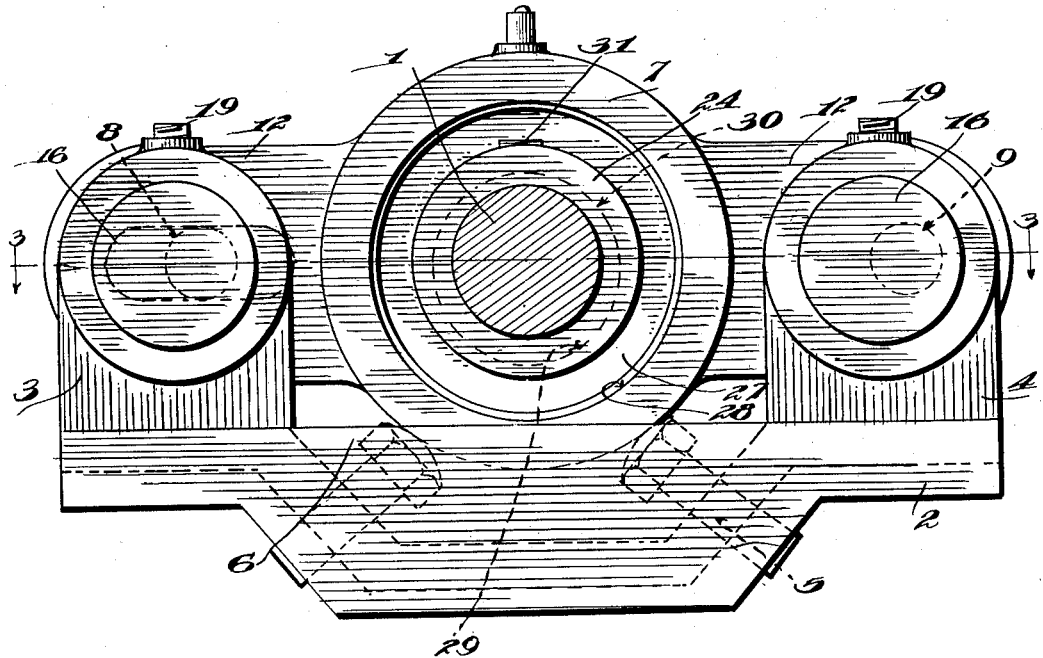
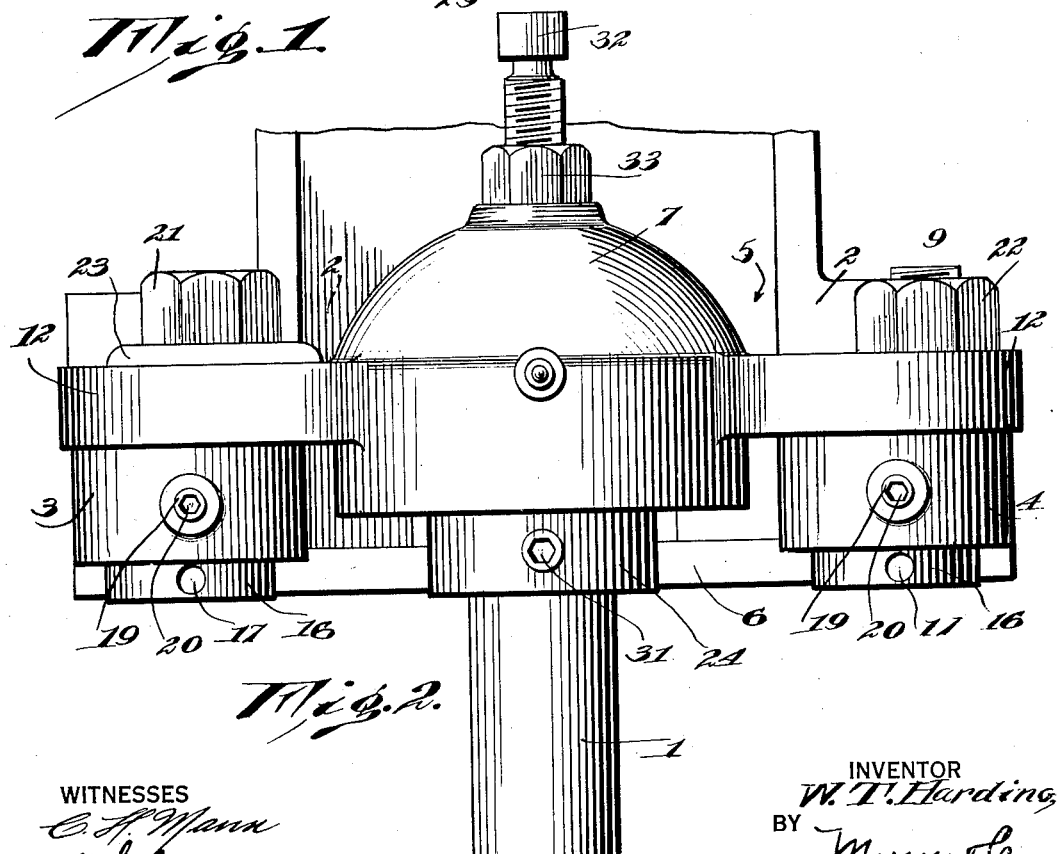

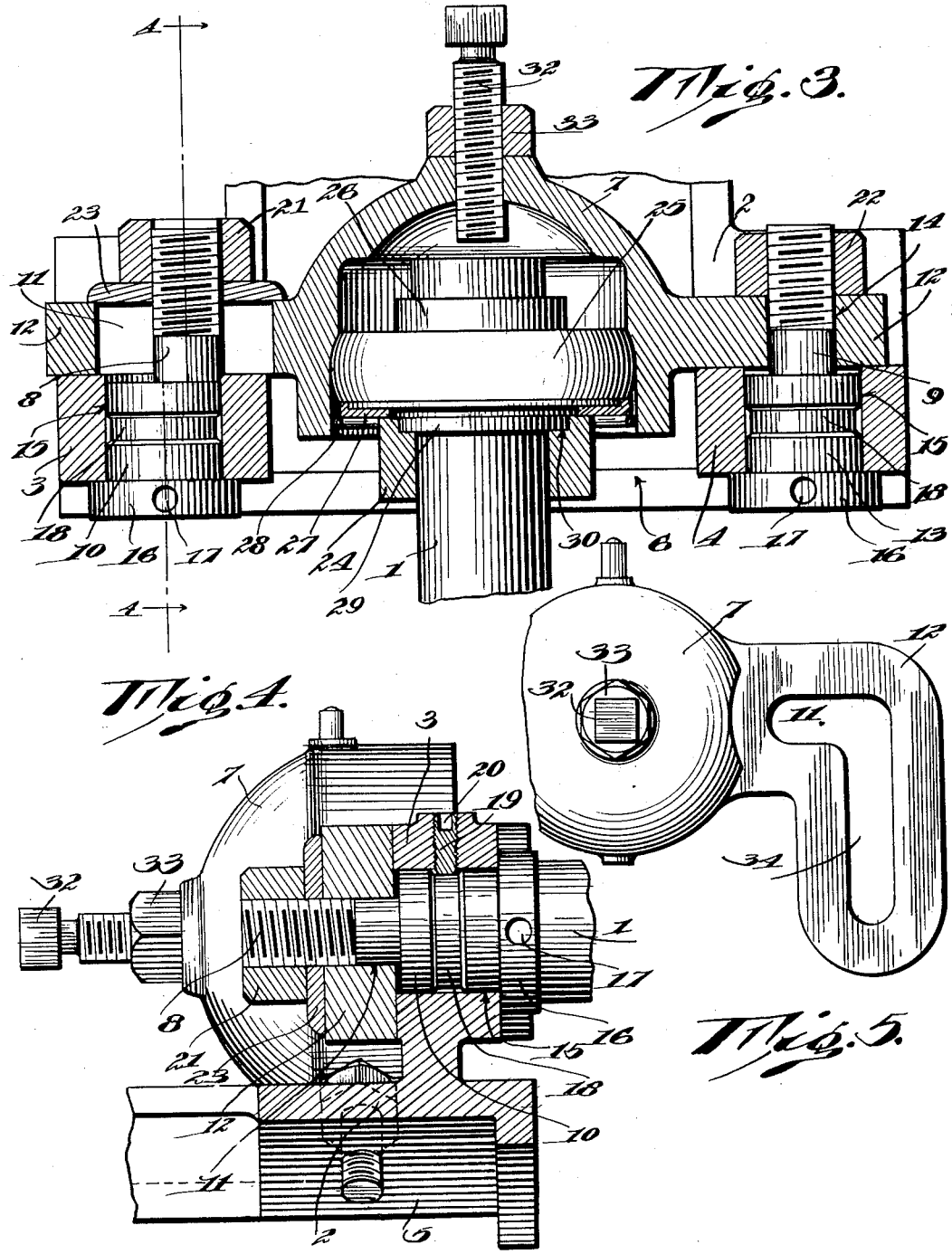

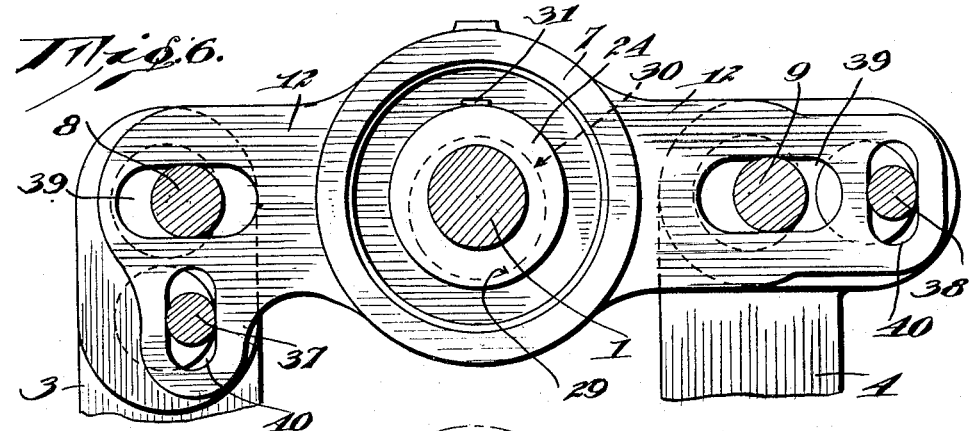
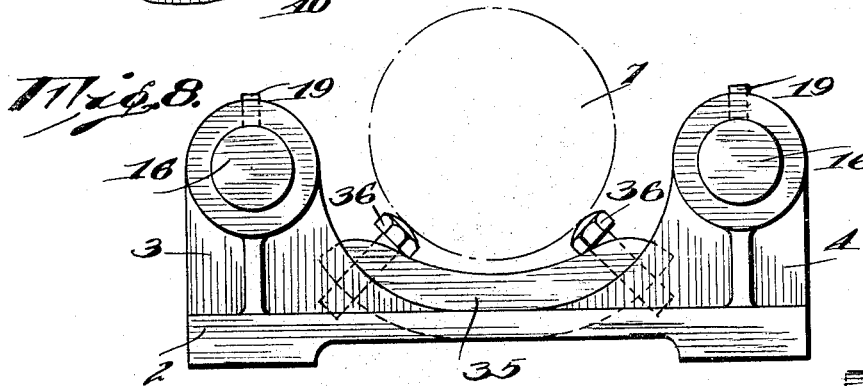
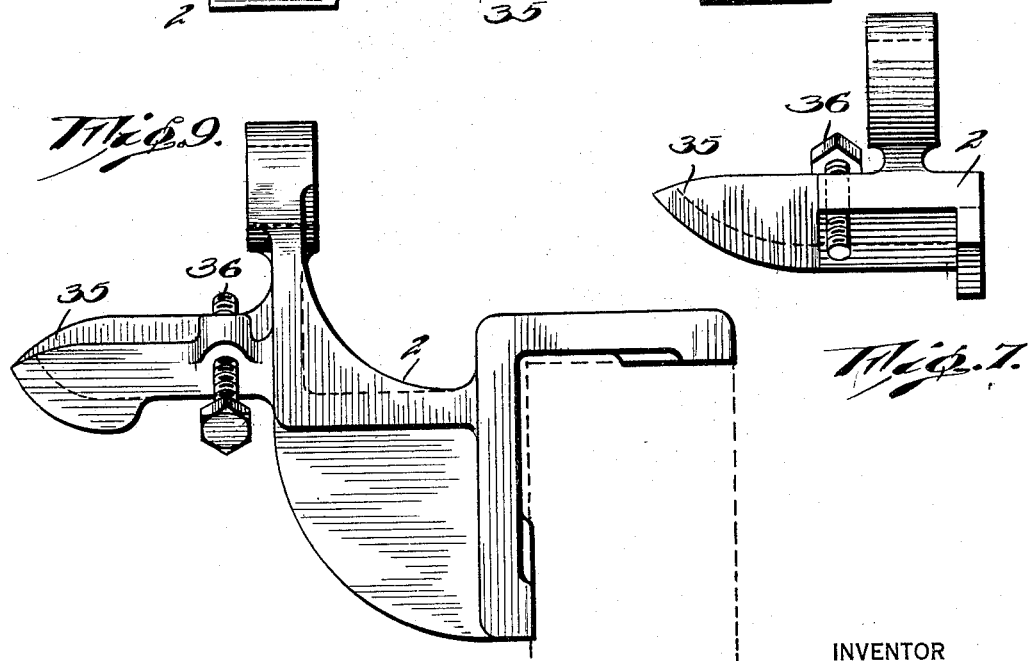

Patented Apr. 3, 1934

1,953,403

UNITED STATES PATENT OFFICE 1,953,403

UNIVERSALLY ADJUSTABLE BEARING BOX

William Thomas Harding, Raleigh, N. C.

Application September 10, 1928, Serial No. 305,036

4 Claims. (Cl. 308—72)

This invention relates to improvements in bearing boxes and it consists of the constructions, combinations and arrangements herein described and claimed.

An object of the invention is to provide a bearing box which is universally adjustable, thus to serve the purposes of certain cotton mill machinery for which it was particularly developed.

Another object of the invention is to provide a bearing box which is capable of mere compensatory actions when making vertical and horizontal adjustments, or such actions whereby the bearing box is raised or lowered at both ends uniformly.

Another and more specific object of the invention is to provide a bearing box by means of which the saw cylinder of a saw gin is capable of adjustment in all directions in respect to the breast or grate and circular brush with which it co-operates.

Other objects and advantages appear in the following specification, reference being had to the accompanying drawings, in which Figure 1 is a side elevation of one of the universally adjustable bearing boxes wherein the vertical and lateral adjustment eccentric pins are shown in horizontal alignment for a purpose later defined, Figure 2 is a plan view of one of the universally adjustable bearing boxes, Figure 3 is a horizontal section taken on the line 3—3 of Figure 1, the lateral adjustment eccentric pin being shown in the uppermost position which it would ordinarily assume, Figure 4 is a detail cross section taken on the line 4—4 of Figure 3, Figure 5 is a detail elevation of the bearing saddle, a slight modification being disclosed, Figure 6 is an elevation parts being shown in section, of any form of bearing box, Figure 7 is a detail end elevation particularly showing a shelf hereinafter described, Figure 8 is a front elevation of the bearing box again showing the shelf, Figure 9 is an end elevation of the bearing box illustrating any style of base.

Although the specific application of the improved bearing box is intended to be to a cotton gin, the reservation is hereby made that the bearing box is applicable to any mechanical contrivance wherein the necessity for the universal adjustment of one part, for example a revoluble shaft, in respect to another part will arise. This holds true for the various types of cotton mill machinery, but it is proposed to confine the application of the invention to one kind of such machinery, namely a gin of the saw type.

As is known to those acquainted with a saw gin, seed-cotton is fed into a receptacle or seed box which has a bottom formed of a grate between the teeth of which an arc of the circumference of a series of revolving circular saws projects. The saw teeth tear the lint from the cotton seed and carry the lint through the grate to a place where it will be removed by a rapidly revolving circular brush.

The necessity for a relative adjustment of the saw cylinder and circular brush will be perfectly obvious when it is borne in mind that the character of the seed-cotton is apt to vary from time to time. Varying characteristics of the seed-cotton may demand a closer adjustment of the saw cylinder to the circular brush, an adjustment further from the circular brush or various adjustments of the saw cylinder in respect to the grate. It is also possible that the circular saws may rub against the teeth of the grate, in which event an end adjustment of the saw cylinder would be necessary.

It is now that the purpose of the invention will become apparent. As indicated by the introductory statements of the objects of the invention, the purpose is to provide a bearing box which is universally adjustable, or perhaps more accurately stated, a bearing box by means of which the saw cylinder shaft can be adjusted either horizontally, vertically or longitudinally and be self-alining.

Reference is made to the drawings in which the illustration is confined to the elements of one bearing box, the only exception being the showing of the shaft 1 which is to be regarded as the shaft of the saw cylinder of a saw gin. It must be understood that a duplicate of the bearing box shown in Figures 2 and 3 must be provided at the opposite end of the shaft 1 so that the latter may have the necessary and proper support.

A base 2 has upstanding supports 3 and 4, usually cast integrally with the base but optionally made separate and secured thereto, and located at the ends of a trough 5. The trough is formed as part of the base. It has a closure wall 6 on the side of the base next to the gin, but is open on the other side. There is a shelf 35 on said side, for a purpose later explained. Any oil or grease dripping from the bearing would tend to accumulate in the trough and not run into the mechanism on the inside where it might come into contact with the seed-cotton and spoil the lint. It is possible to close both sides of the trough, but the open side alluded to has the utilitarian purposes of readily admitting a bearing hub 7 of a bearing saddle into a seating position upon the vertical and lateral adjustment eccentric pins 8 and 9, and providing a place for said shelf, one particular purpose of which is to furnish a rest for the bearing box when removed from the end of the shaft for changing the gin cylinder, etc.

These pins are so termed because of their functions. The pin 8 accomplishes vertical adjustments of the bearing hub 7 and shaft 1. The pin 9 accomplishes lateral adjustments of these parts. For these purposes the pin 8 should ordinarily occupy a position in a plane horizontal to the axis of a pin head 10 and in the slot 11 of one of a pair of ears 12 protruding from the hub 7. Under the same condition the pin 9 should occupy a position in a plane extended vertically from the head 13 of the pin 9. The pin 9 extends through a round hole 14 in the other one of a pair of ears 12, which hole is but a little larger than the pin.

So far it can be readily understood that turning of the head 10 will swing the pin 8 either up or down and thus either raise or lower the left ear 12. The pin 9 will act as a pivot, and the shaft 1 will be raised or lowered accordingly. A turning of the head 13 will swing the pin 9 in either lateral direction, causing the left ear 12 to slide upon the pin 8 by virtue of the slot 11 and the shaft 1 to move either toward the left or right.

It is possible to set the pins 8 and 9 otherwise, that is to say in positions other than 90° apart. One optional setting would be as suggested in Figure 1. This shows the adjustment features in the simplest form. Here the adjustment pins occupy the same positions in relationship to the heads 10 and 13 which carry them. The purpose of such a setting would be to produce a uniform bodily movement of the hub 7 and its appurtenances. Uniform turns of the heads 10 and 13 would raise or lower both ears 12 and thus raise or lower the shaft 1 in a substantially vertical plane. According to the setting in Figure 3, and to the foregoing description, there would be a more or less pronounced arcuate movement of the shaft 1 in the horizontal direction upon turning the pin head 10, and a more or less arcuate movement of the shaft 1 in the vertical direction upon turning the pin head 13. It is possible to make any desired initial setting of the adjustment pins 8 and 9 so that the purposes of the bearing box may be best served for the particular mechanism in which it is used.

Reverting now to the description of the construction, it is to be noted that the heads 10 and 13 occupy bores 15 in the supports 3 and 4. Collars 16 on the pin heads limit the distance to which the heads are insertable into the bores 15, and provide means by which the pin heads may be turned. For the latter purpose the collars have holes 17 into any one of which a bar (not shown) is to be inserted and used as a lever. Each pin head has a circular groove 18 into which the end of a set screw 19 projects in each instance to prevent the retraction of the pin heads from the bores. The set screws have square or other non-circular sockets 20 designed to receive a wrench by which the set screws can be either tightened or released.

The object of tightening the set screws would be to fix the pin heads 10 and 13 in any particular position. It is necessary to loosen one or both set screws 19 prior to making the adjustments of the hub 7 and shaft 1. Should it be desired to only make vertical adjustments by means of the pin 8, the set screw 19 of the head 10 would have to be loosened whereas the set screw of the head 13 would be kept tight so that the pin 9 would be held stationary to act as a pivot for the hub 7.

Nuts 21 and 22 are screwed upon the threaded ends of the pins 8 and 9 that protrude from the ears 12. These nuts are used to secure the hub 7 in a fixed position after the adjustments have been completed. In the case of the pin 8 the nut 21 bears against a washer 23 which serves the primary purpose of covering and concealing the slot 11. In the case of the pin 9 the nut 22 binds directly against the adjacent ear 12 of the hub 7.

A collar 24 fixes the position of the shaft 1 relative to a ball bearing case 25 which is housed by the hub 7. The bearing balls (not shown) revolve in a race between the case 25 and a sleeve 26 which protrudes at both ends of the case as shown in Figure 3. The case 25 is not intended to turn within the hub 7, but the convexity of the periphery and the concavity of that portion of the hub which receives the case will permit a limited amount of rocking motion to compensate for any misalignment of the ball bearings at the opposite ends of the shaft 1. A retainer plate 27 and spring 28 respectively close the exposed end of the bearing and keep the plate in place.

That portion of the sleeve 26 denoted 29 in Figures 1 and 3 is eccentric in shape. A recess 30 in the collar 24 is similarly eccentric. The collar 24 rides the shaft 1, and when the collar is turned upon the eccentric portion 29 there will result a clamping action upon the shaft that will lock the collar 24, sleeve 26 and shaft 1 together. A turn of the shaft 1 in either direction is all that is necessary to do the locking. A set screw 31 in the collar 24 is merely added as a precaution against the collar slipping off of the portion 29.

Longitudinal adjustments of the shaft 1 are made by means of a follower screw 32. The screw can be set by a jam nut 33. It operates in a threaded part of the hub 7. Bearing in mind that there are corresponding screws 32 at each end of the shaft 1, it is readily seen that turning down one or the other of the two screws will move the shaft 1 in either longitudinal direction. The set screw 31 and collar 24 must be loosened before the shaft 1 can slide in the collar 24 and sleeve 26.

In addition to the various adjustments afforded by the pins 8 and 9 and by the follower screw 32 there is another adjustment facility furnished by a pair of stop screws 36. Ordinarily these screws will not be employed for any adjustment. They merely serve as a safety measure. For instance, should the operator neglect tightening the set screws 19 and nuts 21, 22 after making an adjustment of the bearing box, the hub 7 of the bearing saddle would settle upon the heads of the stop screws, thus avoiding the possibility of the saws of the gin being thrust forwardly into and cutting the brush.

Not only will the stop screws 36 function as intended and as described, but owing to their location against the curved hub 7 both the bearing box and set screws are simultaneously locked in the particular adjustment, and the saw cylinder will go on performing its work even with all nuts 21, 22 and the set screws 19 loose or entirely removed. This is due to the fact that the hub 7 will tend to wedge down upon the stop screws 36 and the faces of the supports 3 and 4, while being held in a proper central position by the shaft 1 and ball bearing case 25.

The foregoing simultaneous locking action is mutual. The weight of the bearing saddle upon the stop screws 36 prevents these from turning out of any particular adjusted position, and the presence of the stop screws will prevent the bearing saddle from settling into an unwanted and dangerous position by virtue of an inadvertent failure to set the various screws and nuts after an adjustment of the bearing box. The large margin of safety thus afforded by the combination of the hub 7 and stop screws 36 is an important contribution to a mechanical appliance of this kind. The self-alining feature of the bearing box is apparent.

The angled portions of the trough 5 provide convenient places for the mounting of the stop screws. The angles of these portions are preferably such that the axes of the stop screws will assume radial positions (or nearly so) in respect to the hub 7. In any case the heads of the screws should be well rounded as shown.

Figure 5 illustrates a slight modification of the slotted ear of the hub 7. The view shows the structure as it would appear to an observer looking at the structure in Figure 3 from the top of the page. The original slot is identified at 11, but instead of being a single short slot it is continued at 34 into an L-shape. The long leg of the slot is perpendicular to the short leg, and will ordinarily assume a vertical position. So long as the pin 8 is within the confines of the shortest portion of the slot 11 any turning of the head 10 will result in vertical adjustments of the hub 7. But should the hub 7 be moved laterally to that extent where the pin 8 assumes a position at the base of the slot 34 the hub 7 could be swung vertically until the pin 8 stopped further movement by engaging the extremity of the slot 34.

Another modification of the bearing box is shown in Figure 6. It has been stated that the particular setting of the pins 8 and 9 in Figure 1 will permit uniform bodily movements of the bearing saddle, that is to say, simultaneous turns of the pins 8 and 9 will bodily move the saddle up, down or crosswise. This is the simplest form of the invention. In Figure 6 the bearing box is shown equipped with an auxiliary set of adjustment pins 37 and 38. These pins are confined to make horizontal adjustments of the bearing box. The original pins 8 and 9 will be confined to make vertical adjustments, and in all cases the adjustments of the various pins 8, 9, 37 and 38 would be uniform bodily movements of the bearing saddle.

For these purposes the openings for the pins 8 and 9 in the ears 12 consist of a pair of transversely alined slots 39. The openings for the pins 37 and 38 comprise parallel slots 40 perpendicular to the slots 39. In all cases the adjustment pins are carried by revoluble heads as in the foregoing description.

In further allusion to the shelf 35 it may be stated that this is a mere projection from the so called open side of the base 2. The shelf would by preference have more or less of a curvature as seen in Figure 8. One of its functions is to furnish a rest for the bearing saddle when removed from the shaft 1 for the purpose of changing cylinders. It is also a continuation of the trough 5, and to that end catches any greasy drippings. The trough and shelf are readily wiped out.

Figure 9 shows one of a permissible variety of base castings 2. The shape of the base is not necessarily confined to the showing in Figure 4. Various styles of gin or other machine frames will demand a change in the type of base, and Figure 9 illustrates one of a number of modifications in this respect.

The operation is readily understood. Assume the pins 8 and 9 (Figure 3) to be 90° apart, that is to say, the pin 8 in horizontal line with the axis of the head 10, and the pin 9 in vertical line with the axis of the head 13. Both nuts 21 and 22 must be loosened prior to any adjustment of the hub 7, and either one or both of the set screws 19 must be loosened, depending upon the character of the adjustment to be made.

Should it be desired to merely make vertical adjustments of the hub 7 and shaft 1 the screw 19 of the head 13 may be left in the set position, at which time the head 13 and pin 9 remain rigid fixtures upon the support 4 of the base 2. The other set screw 19 is assumed to have been loosened, and the turning of the head 10 by means of a suitable implement, swings the pin 8 up and down, moving the hub 7 of the bearing saddle up and down. The now stationary pin 9 serves as a pivot. Should it be desired to make lateral adjustments, the pin 8 and head 10 would be held fixed while the head 13 would be loosened so that turns of the head would swing the pin 9 either to the right or left, making adjustments of the bearing saddle in the lateral directions, the slotted ear of the saddle riding upon the now stationary pin 8 which acts as a guide.

In case both pins 8 and 9 are made to assume the same initial position as indicated in Figure 1, turns of the heads 10 and 13 should be made simultaneously in order to keep the bearing saddle in the same position relative to the framework (not shown) when making the adjustments. A longitudinal adjustment of the shaft 1 can be made by the follower screw 32 in Figure 3. For that purpose the set screw 31 (Figure 2) should be loosened so as to free the collar 24. Having turned the screw 32 down sufficiently far to move the shaft 1 into the desired position, the collar 24 would be slid back and locked into position upon the eccentric rim 29 of the bearing sleeve 26 and fixed in that position by the set screw 31. The shaft 1, collar 24, and sleeve 26 would then turn as a unit. The follower screw 32 should be backed off to avoid interference with the free rotation of the shaft.

At other times a form of the device as shown in Figure 6 can be employed. Here the pins 8 and 9 are espectially devoted to making vertical adjustments and an auxiliary set of pins 37 and 38 is provided for the horizontal adjustments. No arcuate motion is intended or desired. The slots are so arranged that only adjustments at right angles to each other will be permissible.

Extreme vertical adjustments of the bearing saddle may be made when employing the modified form of slot 11, 34 shown in Figure 5. Such vertical adjustments as come within the compass of the pin 8 are ordinarily made so long as the pin is kept within the confines of the portion 11 of the slot, but as soon as the bearing saddle is shifted over far enough to bring the slot 34 in registration with the pin 8 the saddle can be rocked upwardly until it is stopped by the engagement of the pin with the extremity of the slot.

While the construction and arrangement of the improved bearing box is that of a generally preferred form, obviously modifications and changes may be made without departing from the spirit of the invention or the scope of the claims.

I claim:—

1. A bearing box comprising a bearing saddle which consists of a hub and a pair of ears projecting laterally in opposite directions, one of which has a hole and the other of which a slot, a pair of individual supports each of which has a bore, a head occupying each bore, a pin eccentrically carried by each head, the pins respectively occupying the hole and slot to sustain the saddle and accomplish adjustments thereof upon turning the heads in the bores, and means to secure either one or both of the heads so that only one may be turned or both may be prevented from turning.

2. A bearing box comprising a bearing saddle which consists of a hub and a pair of ears projecting laterally from the hub so as to substantially be in transverse alignment, one of which has a hole and the other of which a slot, a pair of upstanding supports each of which has a bore, a head occupying each bore, a pin eccentrically carried by each head, the pins respectively occupying the hole and slot to sustain the saddle and accomplish adjustments thereof upon turning the heads in the bores, and means carried by the pins to bind the ears against the supports after the saddle has been adjusted in respect to the supports.

3. A bearing box comprising a bearing hub, a bearing including a case oscillatably set in the hub and a revoluble sleeve to receive a shaft, means carried by the hub to adjust the shaft longitudinally in respect to the sleeve, and means to then fix the shaft to the sleeve to preserve the adjusted relationship.

4. A bearing box comprising a bearing saddle having a pair of ears each with a pair of slots disposed at angles to each other, and independent eccentrically mounted pins in each of the slots certain ones of which are capable of simultaneous adjustment to correspondingly adjust the saddle bodily in specified directions.

WM. T. HARDING.